Jan. 4, 1944.   J. OGNIBENE ET AL   2,338,530
TOOL ALIGNING AND GUIDING DEVICE
Filed Aug. 11, 1942   3 Sheets-Sheet 1

WITNESS:

INVENTORS.
JAMES OGNIBENE
LOUIS RICCI.
BY
*Ely & Pattison*
ATTORNEYS.

Jan. 4, 1944.   J. OGNIBENE ET AL   2,338,530
TOOL ALIGNING AND GUIDING DEVICE
Filed Aug. 11, 1942   3 Sheets-Sheet 2
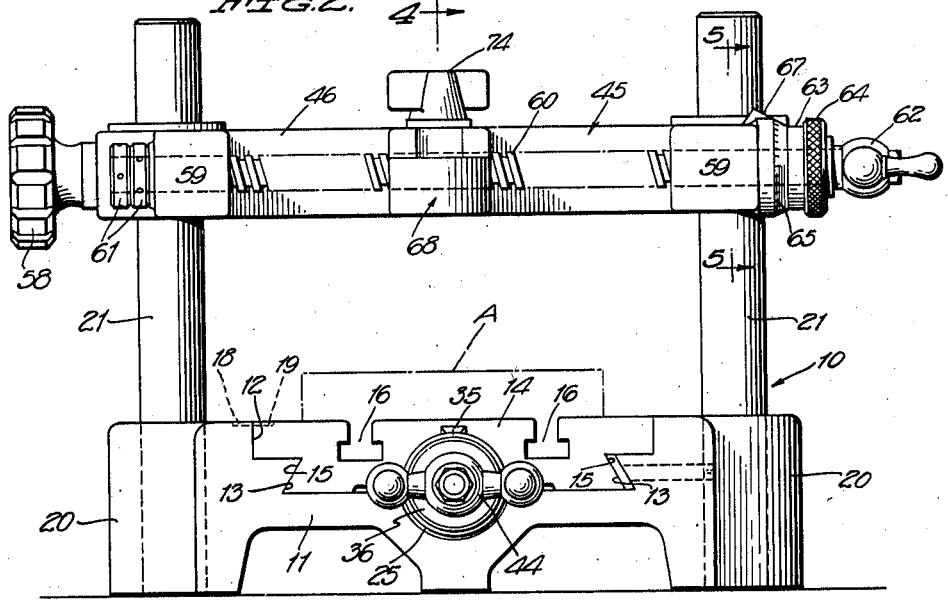
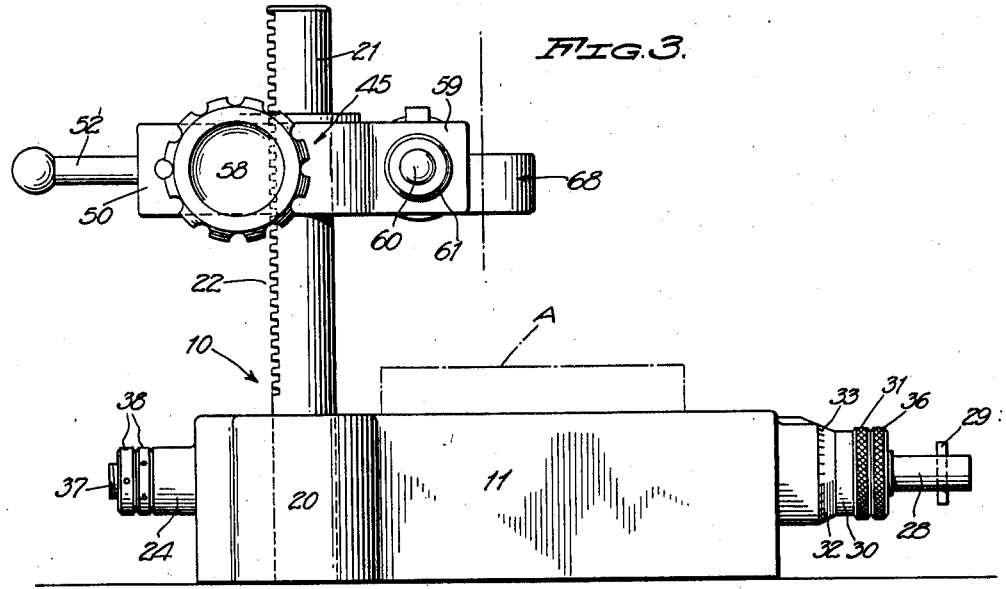
INVENTORS.
JAMES OGNIBENE
LOUIS RICCI.
BY
Ely & Pattison,
ATTORNEYS
WITNESS:

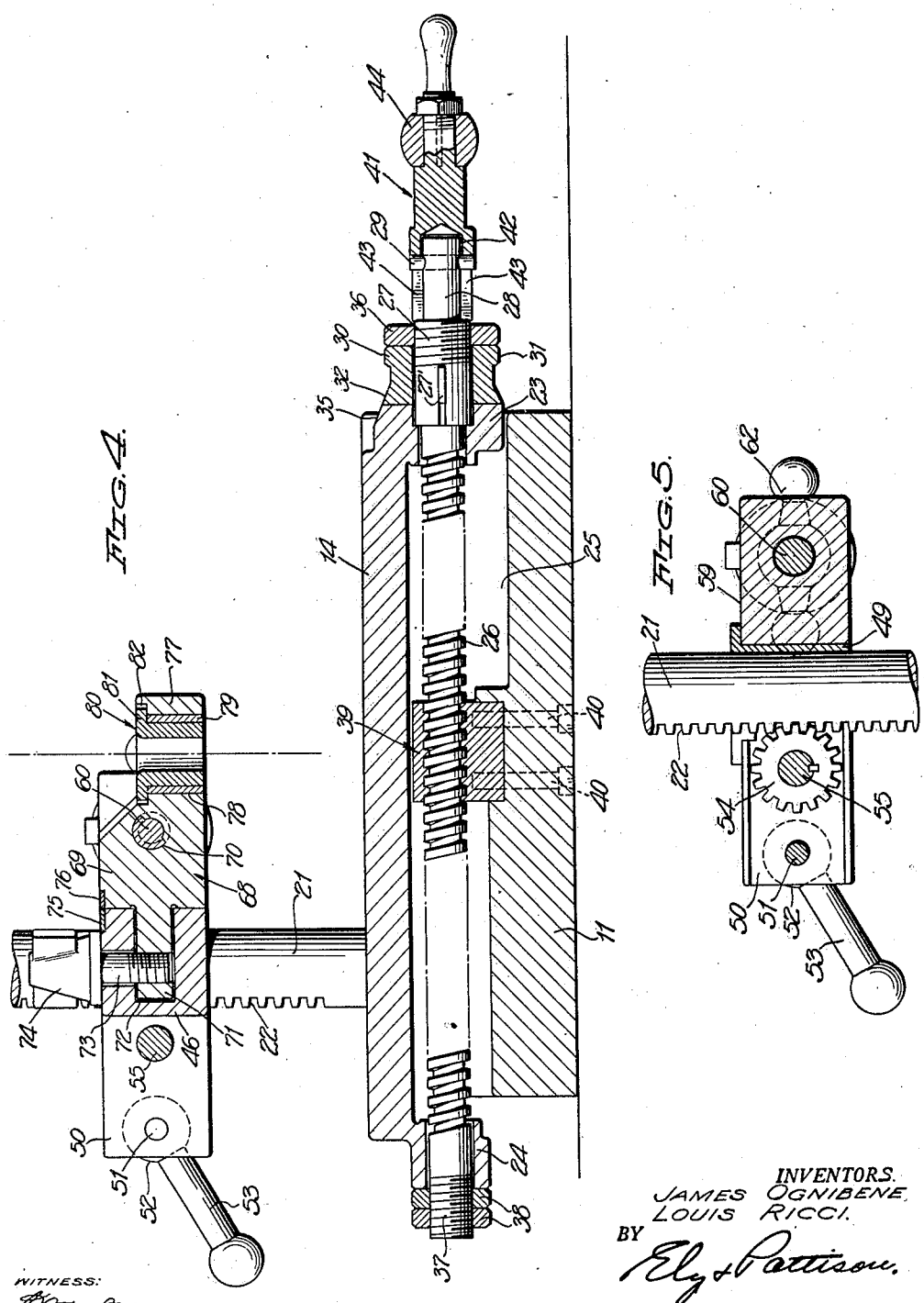

Patented Jan. 4, 1944

2,338,530

UNITED STATES PATENT OFFICE 2,338,530

TOOL ALIGNING AND GUIDING DEVICE

James Ognibene, Brooklyn, and Louis Ricci, Long Island City, N. Y.

Application August 11, 1942, Serial No. 454,386

3 Claims. (Cl. 77—62)

This invention relates to improvements in tool aligning devices for accurately guiding a drill, reamer, or other like tool relative to a piece of work to be worked upon.

We are familiar with the construction and operation of a tool known under the term "jig bore" which is employed for use in accurately aligning a boring tool with a piece of work, but such tool is cumbersome, complicated, and expensive so as to be out of financial reach of the small machinist or machine shop. It is therefore, the principal objects of this invention to provide a tool aligning and guiding device which is simple and inexpensive of construction, portable in use, and easy and accurate of adjustment.

Another feature of the invention resides in a tool guiding device having interchangeable guide bushings to accommodate tools of different diameters.

Other novel features of the invention will become apparent as the following specification is read in conjunction with the accompanying drawings, in which:

Figure 1 is a top plan view of the tool aligning and guiding device with parts broken away in section.

Figure 2 is a front elevational view, the work holder being shown in dot and dash lines.

Figure 3 is a side elevational view.

Figure 4 is an enlarged vertical longitudinal sectional view on the line 4—4 of Figure 2.

Figure 5 is an enlarged detail vertical sectional view on the line 5—5 of Figure 2.

Figure 6 is an enlarged detail vertical sectional view on the line 6—6 of Figure 1.

Figure 7 is a collective perspective view of the removable tool guide bushing and its locking pin.

While the device now to be described is adaptable for uses hereinbefore mentioned, we wish it to be understood that the same is not limited thereto, for it has other uses such as laying out drill jigs, and for what may be termed nuisance work.

Referring to the drawings by reference characters, the numeral 10 designates the tool aligning and guiding device in its entirety which includes a flat rectangular base 11 having a stepped guideway 12 in the top thereof and which extends the length of the base. The lower step portion of the guideway has its opposed sides beveled inwardly as at 13—13. Slidable in the guideway 12 lengthwise thereof is a flat work holder support 14, the top of which is flush with the top of the base 11. The support 14 has opposed beveled longitudinal side portions 15—15 disposed in sliding contact with the beveled surfaces 13—13. The support 14 is of a length approximating the length of the base 11 and is slidable beyond the front and rear ends thereof to minutely calculated distances by means presently to be described. The top face of the support 14 is provided with suitably spaced parallel inverted T-shaped slots 16—16, which slots extend lengthwise for the full length of the support to receive the heads of the bolts of a work holder A shown in dot and dash lines in Figures 2 and 3. Graduations 17 indicative of inches are provided on a scale plate 18 which is set in the top surface of the base 11 adjacent the left side wall of the guideway 12. A vernier scale plate 19 is provided on the top face of the slide support 14 along that edge disposed adjacent the scale plate 18. The vernier scale plate 19 is provided with vernier graduations for cooperative reading with the graduations on the scale plate 18 for accurately obtaining the slide adjustment of the support 14 relative to the base 11. Transversely aligned bosses 20—20 are provided on the base 11 adjacent the rear thereof and which bosses extend beyond the plane of the opposed longitudinal sides of the base. Transversely aligned pillars 21—21 have their lower ends respectively secured in the bosses 20—20 respectively, while their remaining portions rise upwardly therefrom. The rearwardly facing sides of the pillars 21—21 are provided with horizontally disposed rack teeth 22.

The slidable work support 14 is provided with centrally aligned downwardly extending front and rear bearings 23 and 24 respectively, which are slidable into a semi-circular shaped longitudinal recess 25 provided in the base 11. The bearings 23 and 24 respectively rotatably support the front and rear ends of a screw shaft 26. The front end of the screw shaft 26 is provided with a threaded portion 27 and a reduced shank 28. A transverse coupling pin 29 is provided on the shank 28 adjacent its free end. Splined to the screw shaft 26 as at 27' adjacent the threaded portion 27 is a micrometer member 30 which is provided with a knurled manipulating portion 31 and with an annular bevel surface 32 containing an annular series of graduations 33 which are adapted to align with a pointer 34 provided on the bevel surface 35 formed on the front bearing 23. After the screw shaft 26 has been turned to effect an approximate adjustment of the support 14, a further minute vernier adjustment may be obtained by manually grasping the knurled portion 31 and turning the micrometer member 30, which imparts a turning movement to the screw shaft. A jamb nut 36 having a knurled surface is threaded to the threaded portion 27 and when threaded against the member 30, the said member is jammed against the bearing 23 and the screw shaft held against accidental turning. To impart a turning movement to the member 30, the jamb nut 36 must be loosened from its jambing position relative to the said member. The rear end of the screw shaft 26 is threaded as at 37 to which a pair of jamb nuts 38—38 are threaded. The jamb nuts 38—38 remain undisturbed during the adjusting manipulations of the screw shaft.

The screw shaft 26 threads through a nut member 39 which is disposed in the recessed portion 25 centrally between its ends. The nut member 39 is secured to the base 11 by bolts 40.

To effect an initial sliding adjustment to the screw shaft 26, a removable handle member 41 is fitted upon the shank 28. The handle member 41 includes a socket 42, the walls of which are provided with opposed slots 43 extending inwardly from the open end of the socket and which respectively receive the extending ends of the coupling pin 29 when the socket is inserted over the shank. Fixedly attached to the outer end of the socket 42 is a double crank manipulating handle 44. The handle member 41 is applied to the shank 28 when the screw shaft is to be turned to effect an initial adjustment of the screw shaft, after which it is removed therefrom.

Slidably associated with the pillars 21—21 is a horizontally disposed frame member 45. The frame member 45 includes a transverse bridge portion 46 having an elongated slot 47 therein, and split end bearings 48—48 through which the pillars 21—21 extend. Each bearing 48 is provided with a split bushing 49 and with a pair of spaced rearwardly extending resilient ears 50—50. The ears 50—50 are drawn toward each other to lock the bearings 48—48 to the pillars 21—21 after the frame has been raised or lowered to the desired adjusted position relative to the work carried by the slidable work support 14. Associated with each pair of ears 50—50 is a shaft 51 threaded at one end. The threaded end of the shaft is threaded to one of the ears and the other end freely passes through the other of the ears and has a head 52 fixed thereto for bearing engagement with the unthreaded ear. A handle 53 is fixed to the head 52 and extends at right angle to the axis of the shaft 51. By turning the handles 53 to unscrew the shafts 51, the tension on the split bearings 48—48 is relieved, whereupon the frame is free to slide up and down upon the pillars 21—21 to effect an adjustment, after which the handles are turned in a reverse direction to draw the ears toward each other and tighten the bearings 48 about the pillars 21.

Sliding movement is imparted to the frame 45 by gears 54—54 which respectively mesh with the rack teeth 22—22 on the pillars 21—21. The gears 54—54 are fixed to a transverse shaft 55 having its ends respectively journaled in the ears 50 of the bearings 48—48. One end of the shaft 55 is screw threaded as at 56 and threadedly receives a pair of jamb nuts 57. The other end of the shaft 55 has a manipulating knob 58 fixed thereto. When the clamping tension on the split bearings 48—48 is released, the frame 45 may be accurately adjusted to the desired horizontal level by imparting a manual turning movement to the knob 58, whereupon the gears 54—54 will ride over the rack teeth 22 and impart a vertical sliding movement to the frame.

Formed integral with the front sides of the split bearings 48—48 are transversely opposed forwardly extending bearing ears 59—59 in which a transverse screw shaft 60 is journaled. Jamb nuts 61 are threaded to the left end of the shaft 60 while a double crank handle 62 is fixed to the right end thereof. Fixed to the shaft 60 and disposed intermediate the handle 62 and the adjacent bearing ear 59 is a vernier micrometer member 63 having a knurled manipulating portion 64 and a beveled portion 65 having an annular series of graduations thereon for register with a pointer 66 provided on a beveled surface 67 of the bearing ear 59. Initial rotation is imparted to the screw shaft 60 by manual turning of the handle 62, and final vernier movement thereof is obtained by the manual turning of the micrometer member 63 by grasping the knurled manipulating portion 64 thereof.

Rotation of the screw shaft 60 imparts a transverse sliding movement to a carriage 68 which includes a block-like body 69 having a transverse threaded bore 70 therein which has threading engagement with the screw shaft 60. Formed integral with the body 69 and extending rearwardly therefrom is an ear 71 which slidably extends into a transverse channel 72 provided in the bridge bar 46 and which opens on the front side thereof. The slot 47 is provided in the top wall of the channel 72 for the free passage of the threaded shank 73 of a clamping bolt 74. The threaded portion of the shank 73 threads into a threaded hole in the ear 71. When the bolt 74 is screwed inwardly to its limit, it serves to secure the carriage 68 in a position of transverse adjustment relative to the work support 14. The top front edge of the bridge bar 46 is straight and has a scale plate 75 set therein and which is graduated in "inches." The adjacent top straight edge of the body 69 of the carriage 68 has a vernier scale plate 76 set therein and which is cooperative with the graduations on the scale plate 75 for obtaining vernier readings of the transverse adjustment of the carriage 68. By loosening the bolt 74, the carriage 68 is free to slide in a transverse direction upon rotation of the screw shaft 60, and when the proper adjustment is reached, the bolt 74 is tightened to secure the carriage against accidental sliding movement.

The body 69 of the carriage has a forwardly stepped down portion 77 in which a vertical round hole 78 is provided and which is lined with a collar 79. A tool guide bushing member 80 is removably inserted into the lined hole, said member being of an external diameter to snugly fit into the hole and being of an internal diameter slightly greater than the diameter of the drill, reamer or other tool to be guided thereby. The bushing 80 has an annular flange 81 at its top which seats in a countersink or recess 82 provided in the top of the portion 77. The edge of the flange 81 is provided with a round notch 83 which is in radial alignment with a vertical hole 84 in the portion 77 into which a locking pin 85 is inserted. The top of the pin 85 has a head 86 which is complementary in shape to that of the notch 83 into which it extends. The interfitting of the head 86 and notch 83 prevents accidental rotation of the guide bushing 80 relative to the portion 77 of the carriage. The pin 85 extends below the underside of the carriage so that it may be pushed up to facilitate its removal when substituting one size guide bushing 80 for another. A set of different internal diameter guide bushings will constitute part of the complete device, to facilitate interchanging to accommodate drilling and other tools of different cross sectional diameters.

The features and operation of the device 10 is obvious from the foregoing description when read upon the drawings. The work to be drilled, reamed or otherwise worked upon is placed upon the slide work support 14; the frame 45 is vertically adjusted to the proper horizontal level relative to the work by actuating the knob 58, after release of the tension on the split bearings 48—48 and subsequent tensioning of the same; after which the screw shaft 26 is turned initially by the handle 44 and subsequent by the turning of the micrometer member 30 to position the work relative to the guide carriage 68. The guide carriage 68 is transversely adjusted by loosening the bolt 74 and imparting turning movement to the screw shaft 60, initially by manual turning of the handle 62 and final minute turning of the micrometer member 63. These compound adjustments are utilized for vertical aligning the axis of the guide bushing 80 with respect to the exact point on a piece of work that a hole is to be drilled or reamed. When the guide bushing 80 is accurately aligned with the piece of work, the drill or reamer is inserted down through the bore of the guide bushing 80 and thence brought into contact with the work. The bushing member 80 in addition to aligning the tool with the work, also guides the tool during its operation upon the piece of work.

The device 10 is relatively light in weight so as to be portable from bench to boring, drilling, and reaming machines.

While we have shown and described what we consider to be the preferred embodiment of our invention, we wish it to be understood that such changes in construction and design as come within the scope of the appended claims may be resorted to if desired without departing from the true spirit of the invention.

Having thus described the invention, what we claim as new and desire to secure by Letters Patent, is:

1. In a device of the class described, an elongated base adapted to support a piece of work, a pair of spaced transversely aligned pillars secured to said base and rising upwardly therefrom, an elongated frame member having an elongated slot therein, aligned bearings at the ends of the frame member through which the respective pillars extend for slidably mounting the frame member upon the pillars for vertical adjustable movement, releasable means for securing the frame member in various adjusted positions above the base, a carriage member slidably mounted on said frame member for transverse adjustment relative to said base, said carriage having a transverse threaded bore, a screw shaft having threaded engagement with the threaded bore, transversely aligned bearings on the frame member in which the screw shaft is swivelly mounted, a crank handle fixed to the screw shaft to facilitate manual turning movement thereof to effect a transverse adjustment of the carriage, a wing-head bolt passing through the elongated slot and threaded to the carriage for locking the carriage to the frame member to prevent accidental sliding movement thereof after an adjustment of the carriage has been effected, and a tool aligning and guide member carried by said carriage.

2. A device of the class described comprising a rectangular base having a slideway therein extending lengthwise thereof, a work support slidably mounted in said slideway, manually operated means for imparting sliding movement to said work support to effect an adjustment thereof, a pair of transversely aligned pillars rising from said base, an elongated frame member having its ends slidably mounted on the respective pillars for vertical adjustment above the work support, releasable clamping means carried by the respective ends of the frame member for securing the frame member in an adjusted position upon the pillars, said means including resilient split bearings provided on the frame member through which the pillars respectively extend, means associated with each spit bearing for contracting the same into clamping engagement with its related pillar, a carriage slidably mounted on said frame member for transverse movement, manually operated means for imparting sliding movement to said carriage, and a tool aligning and guide member carried by said carriage.

3. In a device of the class described, a flat elongated base adapted to support a piece of work, a pair of spaced transversely aligned pillars secured to said base and rising upwardly therefrom, an elongated frame member provided with transversely aligned resilient split bearings at the ends thereof through which the pillars respectively pass, each of said split bearings having spaced ears, a screw freely passing through one of said ears and being threaded into the other of said ears, whereby tightening of the screws will cause contraction of the split bearings to clamp the same upon the pillars to support the frame member in a vertical adjusted position above said base, rack teeth provided on said pillars, a horizontal shaft journaled in the ears of the split bearings, gears fixed to said shaft in meshing engagement with said rack teeth, and a manipulating knob fixed to one end of said shaft, whereby turning movement may be imparted to said shaft to cause the frame member to freely slide up or down on said pillars upon the loosening of the screws to release the clamping action upon the split bearings.

JAMES OGNIBENE.
LOUIS RICCI.